US008721344B2

(12) United States Patent
Marmaropoulos et al.

(10) Patent No.: US 8,721,344 B2
(45) Date of Patent: May 13, 2014

(54) IMAGING SYSTEM SIMULATOR

(75) Inventors: George Marmaropoulos, Yorktown Hts, NY (US); Giang T. Vu, Peekskill, NY (US); Laszlo Herczegh, Rotterdam (NL); John Jansen, Utrecht (NL); Lekshmy Parameswaran, Rotterdam (NL)

(73) Assignee: Koninklijke Philips N.V., Eindhoven (NL)

( * ) Notice: Subject to any disclaimer, the term of this patent is extended or adjusted under 35 U.S.C. 154(b) by 2410 days.

(21) Appl. No.: 11/458,778

(22) Filed: Jul. 20, 2006

(65) Prior Publication Data

US 2009/0258335 A1 Oct. 15, 2009

Related U.S. Application Data

(60) Provisional application No. 60/704,023, filed on Jul. 29, 2005.

(51) Int. Cl.

| | |
|---|---|
| ***G09B 23/28*** | (2006.01) |
| ***G09B 3/00*** | (2006.01) |
| ***G09B 5/00*** | (2006.01) |
| ***G09B 5/04*** | (2006.01) |
| ***G09B 7/00*** | (2006.01) |
| ***G09B 19/00*** | (2006.01) |
| ***G09B 23/24*** | (2006.01) |
| ***G09B 25/00*** | (2006.01) |
| ***A63H 3/28*** | (2006.01) |
| ***A63H 30/00*** | (2006.01) |
| ***A63H 30/02*** | (2006.01) |
| ***A63H 30/04*** | (2006.01) |

(52) U.S. Cl.

CPC .. *G09B 3/00* (2013.01); *G09B 5/00* (2013.01); *G09B 5/04* (2013.01); *G09B 7/00* (2013.01); *G09B 19/00* (2013.01); *G09B 23/24* (2013.01); *G09B 23/28* (2013.01); *G09B 25/00* (2013.01); *A63H 3/28* (2013.01); *A63H 30/00* (2013.01); *A63H 30/02* (2013.01); *A63H 30/04* (2013.01)

USPC ............ 434/267; 434/262; 434/272; 434/274

(58) Field of Classification Search

CPC .............. G09B 3/00; G09B 5/00; G09B 7/00; G09B 19/00; G09B 23/24; G09B 23/28; G09B 25/00; A63H 3/28; A63H 3/33; A63H 30/00; A63H 30/02; A63H 30/04

USPC ............. 434/167, 169, 298, 307 R, 320, 322, 434/323, 327, 350, 351, 362, 393; 369/63; 446/175, 297, 301; 463/42, 43

See application file for complete search history.

(56) References Cited

U.S. PATENT DOCUMENTS

| | | | | |
|---|---|---|---|---|
| 4,622,013 A * | 11/1986 | Cerchio | ........................ | 434/118 |
| 5,243,693 A * | 9/1993 | Maron | .......................... | 345/634 |

(Continued)

OTHER PUBLICATIONS

Getting Started. Brochure of the F.M. Kirby Research Center for Functional Brain Imaging. Kennedy Krieger Institute & Johns Hopkins University [version of Feb. 7, 2002] Retrieved Jan. 7, 2011 from Kennedy Krieger Institute Web site <www.lmir.kennedykrieger.org> and Internet Archive Wayback Machine <www.web.archive.org>.*

(Continued)

*Primary Examiner* — Nikolai A Gishnock

(57) ABSTRACT

A medical training and simulation system includes a plurality of inanimate objects, each being associated with an identification tag which stores an identification code which uniquely identifies an associated object. A database stores information of the objects. A reader reads a respective identification code of a selected object. An information retrieving processor retrieves the stored information which corresponds to the read identification code of the selected object. A device reproduces at least a portion of the retrieved information of the selected object.

21 Claims, 2 Drawing Sheets

(56) References Cited

U.S. PATENT DOCUMENTS

| | | | | |
|---|---|---|---|---|
| 5,609,485 | A | 3/1997 | Bergman et al. | |
| 5,855,483 | A * | 1/1999 | Collins et al. | 434/322 |
| 6,117,078 | A * | 9/2000 | Lysyansky et al. | 434/262 |
| 6,283,763 | B1 * | 9/2001 | Matsuzaki et al. | 434/262 |
| 6,773,344 | B1 * | 8/2004 | Gabai et al. | 463/1 |
| 6,817,866 | B1 * | 11/2004 | Ginzburg et al. | 434/365 |
| 7,257,189 | B2 * | 8/2007 | Modica et al. | 434/219 |
| 7,665,995 | B2 * | 2/2010 | Toly | 434/262 |
| 7,903,783 | B2 * | 3/2011 | Modica et al. | 434/219 |
| 8,162,668 | B2 * | 4/2012 | Toly | 434/267 |
| 8,498,376 | B2 * | 7/2013 | Modica et al. | 434/219 |
| 2002/0088926 | A1 | 7/2002 | Prasser | |
| 2005/0122108 | A1 * | 6/2005 | Yasuhara et al. | 324/318 |

OTHER PUBLICATIONS

Herwald, Margi. A Hand to Hold. Jun. 10, 2004. Cleveland Jewish News [Retrieved Jan. 7, 2001 from http://www.clevelandjewishnews.com/articles/2004/06/10/news/local/acover0611.prt].*

Powers, Scott. Empirically Supported Treatments in Pediatric Psychology: Procedure-Related Pain. Jnl. Ped. Psych, vol. 24, No. 2, 1999. pp. 131-145.*

Claesson, T., et al.; A CT demonstrator based on a CZT solid state detector; pp. 1-3.

* cited by examiner

IMAGING SYSTEM SIMULATOR

CROSS REFERENCE TO RELATED APPLICATIONS

This application claims the benefit of U.S. provisional application Ser. No. 60/704,023 filed Jul. 29, 2005, which is incorporated herein by reference.

BACKGROUND OF THE INVENTION

The following relates to medical arts. It finds particular application in conjunction with computed tomography (CT) simulations and will be described with particular reference thereto. However, it finds application in simulating other types of imaging, such as single photon emission computed tomography (SPECT), positron emission tomography (PET), three-dimensional x-ray imaging, ultrasound imaging, magnetic resonance imaging (MRI), and the like.

In general, a computed-tomography system comprises an x-ray source and an x-ray detector which rotates around a subject to be examined. From several orientations, the subject is irradiated with an x-ray beam from the x-ray source. The x-ray detector receives x-radiation that has passed through the subject at the respective orientations and forms an attenuation profile for the orientation at issue. The attenuation profiles represent the attenuation of incident x-rays in the object due to and absorption or scattering of x-rays along the path of the x-rays through the subject at the orientation at issue.

Typically, the subject is positioned on a couch which is moved linearly into a cylindrical bore of a CT scanner. A CT scan is often an uncomfortable process for most people, especially young children. In the past, various approaches have been taken to put young children at ease with diagnostic imaging procedures. One known approach uses a book with animal characters. The animal characters explain the imaging procedure to the children. Another approach uses an animated presentation explanation of the imaging procedure. In this approach, a three dimensional toy walks children through the imaging procedure. Yet another approach uses a wooden toy model of a scanner which helps to explain to the children the imaging procedure. A typical ultrasound system acquires image information by positioning a probe on the surface of the subject with an acoustic coupling gel, transmitting a series of ultrasound waves into the object, and detecting the ultrasound echoes reflected therefrom. The known ultrasound training systems are not appropriate for children. In summary, the current approaches are not universal and not effective. In many cases, the unfamiliarity with the environment and lack of knowledge of the actual scanning process increases patient's anxiety which might lead to cancellations of scheduled scanning sessions with a corresponding financial impact on the health care providers.

The present application contemplates a new and improved method and apparatus that overcomes the above-referenced problems and others.

SUMMARY OF THE INVENTION

In accordance with one aspect of the present application, a medical training and simulation system is disclosed. A plurality of inanimate objects, each is associated with an identification tag, which stores an identification code which uniquely identifies an associated object. A database stores information of the objects. A reader reads a respective identification code of a selected object. An information retrieving processor retrieves the stored information which corresponds to the read identification code of the selected object. A device reproduces at least a portion of the retrieved information of the selected object.

In accordance with another aspect, a simulation and education method is disclosed. An identification code, which identifies a selected inanimate object, is read. Stored data which corresponds to the read identification code of the selected object is received. A diagnostic image of the identified object is generated from the retrieved stored data.

One advantage of the present invention resides in effective patient's education prior to imaging.

Another advantage resides in alleviating patient's anxiety.

Another advantage resides in simplified presentation of function and purpose of an imaging system.

Another advantage resides in interactive presentation of function and purpose of an imaging system.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
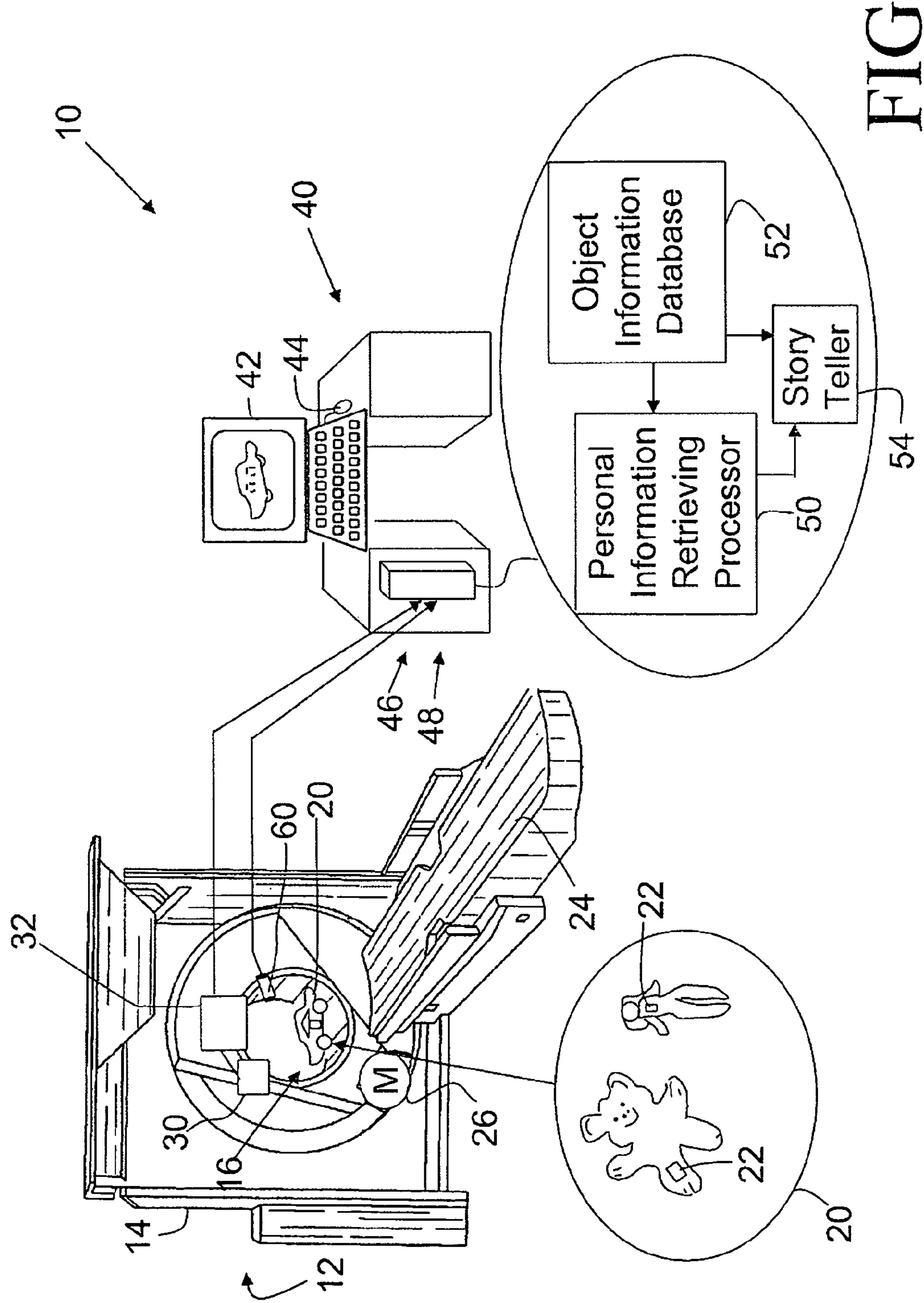
FIG. 1 is a diagrammatic illustration of a model monitoring system for toys.

With reference to FIG. 1, an imaging simulation system 10 includes a scaled model of a diagnostic imaging scanner or simulator 12 to effectively explain the imaging procedure to the patients. The simulator 12 includes many like parts to a real diagnostic scanner, such as a CT scanner, MRI simulator, SPECT simulator, PET simulator, ultrasound simulator, and other imaging simulators. For example, the simulator 12 includes a non-rotating gantry 14. A bore 16 defines an examination region of the simulator 12. A plurality of objects 20 such as toys is each identified with an identification (ID) tag 22 encoded with a unique identification code. The ID tag 22, for example, can be an RFID chip, a color tag, a shape tag, an RF tag, and other appropriately identifiable tag. The ID tag 22 is embedded or otherwise associated with each object 20. The toys 20 are made of an appropriate size and material which is appropriate for use with the simulator 12. A selected object 20 is positioned on an examination table or couch or bed 24 which is linearly moved into the examination region 16 by a motor drive 26. Of course, it is contemplated that the selected object 20 can be moved into the examination region 16 by other means, as for example, is placed directly into the CT simulator bore 16 by a user, slide along a stationary couch or bed, or the like. Likewise, the examination table 24 can be manually slid into the examination region 16 by the user.

A simulation triggering device or means 30 activates an ID tag reader or means 32 which is positioned about an opening of the bore 16 of the CT simulator 12. The reading distance of the ID tag reader 32 is selected to cover the entire diameter of the bore opening. The ID reader 32 is linked with a workstation 40 such as a personal computer, a network computer, a laptop, and the like. The workstation 40 includes a monitor 42, an input device 44, software 46 and hardware 48 for processing and displaying simulated images. The monitor 42 can be integrated in the simulator 12, located outside the simulator 12 such as in the examination room or any other appropriate location for the users to view the displayed images.

It is contemplated that the simulation triggering device 30 can be any appropriate device such as a motion sensor to detect the motion of the bed 24 to trigger the ID reader 32. Other examples of the simulation triggering device 30 are a push button and a switch. When triggered by the simulation triggering device 30, the ID reader 32 reads a corresponding ID tag 22 of the object 20 which is positioned in the examination region 16. For example, each ID tag 22 includes a unique RFID tag. The ID reader 32 uses RF technology to read the RFID tag 22. As another example, the ID reader 32, such as camera, uses an imaging technology to identify the color and/or shape of the object 20. Also, the ID reader can be disposed in other locations, such as on the couch, on a separate structure, or the like.

An information or image retrieving processor 50 locates a corresponding personal information about the selected object 20 such as prescanned actual x-ray images, animated internal images, and the like in an object information database 52. The object information database 52 includes any information pertinent to the selected object 20 such as personal traits, a medical history, prescanned images, a unique soundtrack, an animation of medical examination, and like attributes which help patients to better understand the examination procedure and overcome fear associated with the examination. A retrieved prescanned image of the object interior is displayed on the monitor 42. In one embodiment, the personal information retrieving processor 50 triggers a story teller 54, which presents an animation which uses children friendly characters related to the object 20 positioned in the examination region 16. The animation tells a story about the particular object or toy character and explains particulars of the imaging procedure. For example, an animation story may involve the crocodile that follows Captain Hook. When the crocodile is placed in the scanner, the story of the crocodile's strange "ticking" ailment is told and the monitor 42 displays an image showing an interior view of the crocodile which shows the clock in the crocodile's stomach. The story also explains the imaging procedure, why the crocodile is doing it, the crocodile apprehension of the imaging machine, the painlessness of the procedure, and the like.

It is contemplated that the information retrieving processor 50 can retrieve and present unique stories and views for each of a plurality of toys and audio, video, and the like presentations which are educational.

As one educational aspect, in one embodiment, a motion sensor 60 is positioned to monitor the bore 16 to detect motion of the object 20. If the object 20 moves, the imaging simulation system 10 displays a blurred or unclear image on the monitor 42 by blurring the current image or displaying a previously recorded blurred image. Such procedure emphasizes the importance of remaining still during the imaging procedure.

In another embodiment, the child carries the encoded toy into the actual examination room with him/her. When the toy's encoding is read adjacent the diagnostic scanner, an animated display is generated in the examination room in which an animation of the carried toy eases the child's apprehensions and guides the child through the imaging procedure. As a further extension, the toy can cause similar displays in other treatment environments in other parts of the hospital.

Figure 2:
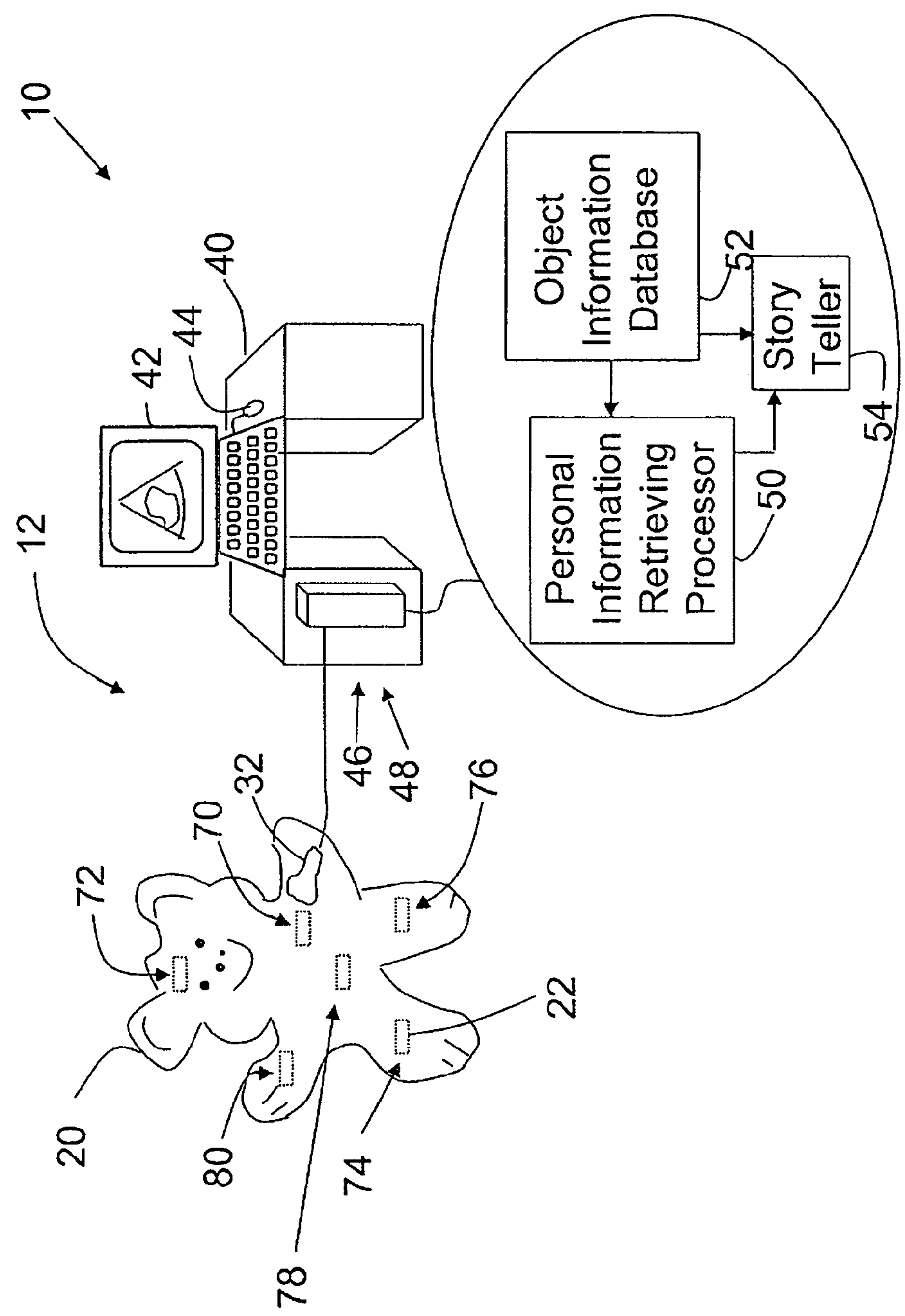
FIG. 2 is a diagrammatic illustration of a portion of the monitoring system.

With continuing reference to FIG. 1 and further reference to FIG. 2, the imaging simulation system 10 simulates an ultrasound imaging procedure. The simulation system 10 includes the ID tag reader 32 in a shape of an ultrasound probe which is familiar to the patients. A typical ultrasound system acquires image information by transmitting a series of ultrasound waves into the object and then detecting the ultrasound echoes reflected therefrom. The ultrasound simulation system 10 includes the plurality of objects 20 such as toys, as described above. Each toy 20 includes one or more identification (ID) tags 22 which are embedded in the toy 20 in one or more various locations to associate with various imaging regions, e.g. organs. For example, the ID tags 22 are embedded under the skin surface, in the area of heart 70, head 72, legs 74, 76, stomach 78, arm 80, etc. The ID tag 22, for example, can be a color tag, a shape tag, an RF tag, and other appropriately identifiable tag. The ID tag reader 32 uses an appropriate technology to read the ID tag 22. The reading distance of the ID reader 32 is adjusted to be relatively short. The object or toy 20 is positioned on the examination table 24 for a demonstration of the examination. When the ID reader 32 identifies the ID tag related to a particular organ, the prescanned image retrieving processor 50 retrieves a prescanned image of the organ that corresponds to the ID tag, from the prescanned images database 52. The simulation system 10 displays the retrieved prescanned ultrasound or animation image which represents the image of the organ on the monitor 42.

Of course, it is contemplated that the above described exemplary embodiments are applicable to educate the adult patients as well as children.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A medical training and simulation system comprising:

an imaging simulator which includes a model of a diagnostic imaging scanner and defines an associated examination region;

a plurality of inanimate objects, each being associated with an identification tag which stores an identification code which uniquely identifies an associated object;

a database which stores information of the objects;

a reader which reads an associated identification code of a selected object, the reader being disposed adjacent to the examination region for reading the respective identification code of the selected object when positioned in the examination region;

an information retrieving processor for retrieving the stored information which corresponds to the read identification code of the selected object; and a monitor which displays images depicting an interior portion of the object according to the retrieved stored information.

2. The system as set forth in claim 1, wherein the objects are toys which resemble a patient.

3. The system as set forth in claim 1, wherein the monitor displays a story teller who presents a medical story relating to the selected object.

4. The system as set forth in claim 3, wherein the story includes an animation simulating an imaging procedure.

5. The system as set forth in claim 1, further including:

a motion sensor which detects motion of the object positioned in the examination region and triggering a blurring of the displayed image.

6. The system as set forth in claim 1, wherein a plurality of identification tags are associated with the selected object, each identification tag identifies an interior portion of the object.

7. The system as set forth in claim 6, wherein the image retrieving processor retrieves a portion of the stored information which corresponds to the identified interior portion of the object; and the monitor displays an image depicting the identified interior portion of the object based on the retrieved portion of the stored information.

8. The system as set forth in claim 7, wherein the interior portion of the object includes one of:

a heart;

a stomach;

a head;

a leg; and an arm.

9. The system as set forth in claim 1, wherein the model of the diagnostic imaging scanner depicts one of:

an MRI scanner;

a CT scanner;

a digital x-ray scanner;

a SPECT scanner;

a PET scanner; and an ultrasound scanner.

10. The system as set forth in claim 1, further including:

a simulation triggering device for triggering the reader when motion of a bed which is moved into the examination region is detected.

11. A simulation and education method comprising:

positioning a selected inanimate object in an examination region defined in a model of a diagnostic imaging scanner;

reading an identification code stored on an identification associated with the inanimate object which identifies the selected inanimate object positioned in the examination region;

retrieving from computer memory stored data which describes at least an interior region of the identified inanimate object in the examination region; and displaying on a monitor a diagnostic image depicting the interior portion of the identified object according to the retrieved stored data.

12. The method as set forth in claim 11, wherein the object includes one of a plurality of toys which simulate at least one of a human or animal patient.

13. The method as set forth in claim 11, wherein the stored data includes a medical story about the selected object and further:

displaying on the monitor a story teller who presents the medical story relating to the selected object.

14. The method as set forth in claim 13, wherein the story includes an animation simulating an imaging procedure.

15. The method as set forth in claim 11, further including:

associating a plurality of identification tags with the selected object, each identification tag identifies an interior portion of the object.

16. The method as set forth in claim 15, further including:

retrieving a portion of previously stored image data which corresponds to the identified interior portion of the object; and displaying an image depicting the identified interior portion of the object based on the retrieved portion of the stored data.

17. The method as set forth in claim 11, further including:

detecting a motion of the object positioned in the examination region; and triggering a blurring of the displayed image to demonstrate the importance of remaining still during the imaging procedure.

18. The method as set forth in claim 11, wherein the model of the diagnostic imaging scanner depicts at least one of:

an MRI imaging scanner;

a CT imaging scanner;

a SPECT scanner;

a PET scanner;

an x-ray system; and an ultrasound imager.

19. The system as set forth in claim 1, wherein the examination region is in a bore defined in the model.

20. A medical training and simulation system, comprising:

a plurality of toys which resembles at least one of humans and animals;

a model of a diagnostic imaging scanner which defines an examination region which receives one of the toys;

a reader which identifies the one of the toys which is received in the examination region;

a memory which stores information for each of the toys, the information including at least one of an image depicting an interior region of each toy, a medical story about each toy, and an animation simulating an imaging procedure;

a monitor which displays images; and a processor connected with the reader to receive an identification of the one of the toys received in the examination region, connected with the memory to retrieve the information for the one of the toys received in the examination region, and connected to the monitor to control the monitor to display the retrieved information.

21. The medical training and simulation system as set forth in claim 20, wherein the memory stores a simulated diagnostic image of an interior of each toy and the monitor displays the diagnostic image corresponding to the identified toy retrieved from the memory.

* * * * *